(12) United States Patent
Dadiomov et al.

(10) Patent No.: US 7,631,315 B2
(45) Date of Patent: Dec. 8, 2009

(54) USING SUBQUEUES TO ENHANCE LOCAL MESSAGE PROCESSING

(75) Inventors: Alexander Dadiomov, Redmond, WA (US); Richard D. Hill, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 11/092,262

(22) Filed: Mar. 28, 2005

(65) Prior Publication Data
US 2006/0218560 A1    Sep. 28, 2006

(51) Int. Cl.
*G06F 9/46* (2006.01)
*G06F 15/173* (2006.01)
(52) U.S. Cl. ...................... 719/314; 709/238
(58) Field of Classification Search .............. 719/314; 709/238, 244
See application file for complete search history.

(56) References Cited

U.S. PATENT DOCUMENTS

| | | | | |
|---|---|---|---|---|
| 6,052,812 | A * | 4/2000 | Chen et al. ................... | 714/751 |
| 6,058,389 | A | 5/2000 | Chandra et al. | |
| 2003/0028580 | A1* | 2/2003 | Kucherawy ................. | 709/101 |
| 2003/0182464 | A1* | 9/2003 | Hamilton et al. ............ | 709/314 |
| 2003/0233466 | A1* | 12/2003 | Kinkade ...................... | 709/232 |
| 2005/0267941 | A1* | 12/2005 | Addante et al. ............. | 709/206 |

FOREIGN PATENT DOCUMENTS

GB    2351 573    3/2001

WO    WO 01/33407    5/2001

OTHER PUBLICATIONS

Kaplan "Purely Functional, Real-time deques with catenation", 1999, ACM 0004-5411/99/0900-0577, pp. 577-603.*
Blelloch, "Scalable Room Synchronizations", 2003, pp. 397-430.*
Mohri, "Syntactic Analysis by local grammars automata: an efficient algorithm", Jul. 4, 1994, pp. 1-13.*
BEA Systems Inc., "BEA Messa eQ: Introducetion to Messa e Queuin", BEA Systems Inc., BEA Messa eQ for OpenVMS Version 5.0, Document Edition 5.0, Mar. 2000 Retrieved from the internet: URL:http://e-docs.bea.com/tuxedo/msgq/pdf/mqintro.pdf>.
Horrell, Simon, "Microsoft Message Queue (MSMQ)", Enterprise Middleware, Xephone Newbury, Jun. 1999.

* cited by examiner

*Primary Examiner*—Van H Nguyen
*Assistant Examiner*—Phuong N Hoang
(74) *Attorney, Agent, or Firm*—Workman Nydegger (57) ABSTRACT

The present invention extends to methods, systems, and computer program products for using subqueues to enhance local message processing. Messages include queue IDs comprised of a parent portion and a suffix portion. The parent portion identifies a parent queue and the suffix portion identifies a subqueue of the parent queue. Message are logically moved between queues by changing suffix values, such as, for example, between subqueues, between the parent queue and a subqueue, and between a subqueue and the parent queue. Applications can examine messages and route messages to specified subqueues based on message content (including message bodies and headers). Suffix values can be changed in place (e.g., while the message remains physically stored in the queue) so as to preserve message sender identity and to avoid prematurely acknowledging delivery (i.e., no return ACK is generated).

13 Claims, 6 Drawing Sheets

USING SUBQUEUES TO ENHANCE LOCAL MESSAGE PROCESSING

CROSS-REFERENCE TO RELATED APPLICATIONS

Not applicable.

BACKGROUND OF THE INVENTION

1. The Field of the Invention

The present invention relates to electronic messaging and, more particularly, to using subqueues to enhance local message processing.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

Networks have in fact become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In order to communicate over a network, one computing system (referred to herein as a "sending computing system") constructs or otherwise accesses an electronic message and transmits the electronic message over a network to another computing system (referred to herein as a "receiving computing system"). The electronic message may be read by a human user as when the electronic message is an e-mail or instant message, or may be read, instead, by an application running on the receiving computing system. The electronic message may be constructed by an application running on the sending computing system with the possible assistance of a human user.

In some environments, applications communicate with one another using queued message communication. Queued communication includes mechanisms for a sending application to write a message into a sending queue, the sending queue to transfer the message to a receiving queue, and for a receiving application to read the message from the receiving queue. The queues maintain communication state outside of the communicating parties, and provide a level of indirection between them. Accordingly, queued messaging provides reliable communication between loosely coupled applications. Senders and receivers of messages use intermediary queue managers to communicate, and may independently shut down and restart and may even have non-overlapping lifetimes. Queuing also allows clients and servers to send and receive messages "at their own pace" with the queue taking up the slack at either end.

Often, a receiving computer system will publish a single receiving queue name so that other computer systems can send messages into the receiving queue. The messages can be subsequently delivered from the receiving queue to an appropriate application. In some environments, messages are moved from the receiving queue into other queues at the receiving computer system. For example, a queue manager may determine that a queued message is temporarily not processable (e.g., when the appropriate application is not available). Thus, the queue manager can move the queued message from the receiving queue into another queue so as to make other queued messages available for processing. At some later time, the queue manager can move the queued message back into the receiving queue and determined whether or not the queued message is now processable.

From time to time, it may also be necessary for a queue manager to sort messages in the receiving queue into separate groups, such as, for example, to route the messages to different processing units. However, queues are typically monolithic and do not have any organized structure. Thus, appropriate sorting of messages in a receiving queue may only be achievable by moving messages out of the receiving queue and into other queues at the receiving computer system.

It may also be that an application accesses a message and subsequently moves the message to a different queue. For example, when an application detects a poisonous message (e.g., after a specified number of failed reads or failed attempts at processing the message), the application can temporarily move the poisonous message to another queue (e.g., a poisonous message queue) so other messages in the receiving queue can continue to be processed. Then at some later time, the application can move the poisonous message back into the receiving queue and attempt to read and process the poisonous message again.

However, "move" operations can be resource intensive. For example, a move operation can cause a message to be physically moved from one memory location to another memory location.

Further, when a receiving application moves a message between queues, previously assigned identity information (the identity of the original sender) can be lost. A typical mechanism for moving a message from one queue to another queue is to "Receive" from one queue and "Send" to the other queue. However, during the message move the message typically leaves the messaging system (when Receive is called) and reenters the messaging system (when Send is called). Thus, the messaging system loses track of the message for some amount of time and treats the reentering message as a new message. Since the messaging system treats the message as a new message, it can assign the identity of the mover to the message, losing the identity of the original sender.

The removal of the message from the messaging system during the message move is problematic at least for one reason. Since the message leaves the messaging system, the Receive causes a delivery acknowledgment ("ACK") to be sent. The original sender can receive the ACK and views the ACK as an indication that delivery guarantees have been met. That is, the ACK indicates to the sending application that the receiving application processed the message. However, if the message was transferred between queues, actual delivery to the receiving application may not have occurred. Thus, the sending application may inappropriately treat the message as processed. In response to the ACK, the sending application may remove the message from a local cache and proceed with sending other messages in a message sequence.

Unfortunately, after the receiving application moves the message back into the receiving queue and again attempts to process the message, further failures can occur. Eventually, after a specified number of failures (and potentially further moves between queues) the receiving application may inform the sending application that it could not process the message. The sending application may, in response, try to resend the message. However, since the sending application previously removed the message from cache in response to the ACK, the sending application may have no way to identify the message or access the contents of the message.

Further problems can also occur. For example, due to policy reasons (e.g., security or quota settings) a new queue may fail to accept a message from a moving queue. The new queue's failure to accept the message can cause the message to instead be moved to a dead message queue at the mover.

Therefore systems, methods, and computer program products for more efficient and more accurately acknowledged local message processing would be advantageous.

BRIEF SUMMARY OF THE INVENTION

The foregoing problems with the prior state of the art are overcome by the principles of the present invention, which are directed towards methods, systems, and computer program products for using subqueues to enhance local message processing. In some embodiments, received messages are partitioned into subqueues. For example, a queue manager receives a message for delivery to a receiving application from a sending application. The message includes a queue identifier having a parent value portion storing a parent value that identifies a receiving queue.

The queue manager enqueues the message in the receiving queue based on the stored parent value. The receiving application examines the enqueued message. The receiving application assigns a subqueue suffix value that identifies a sub-queue of the receiving queue. The application stores the subqueue suffix value in a suffix value portion of the queue identifier so as to logically move the message from the receiving queue to the identified subqueue of the receiving queue in accordance with the message examination.

In other embodiments, a message is moved between queues. For example, a queue manager receives a first handle that identifies a first queue. The first handle includes a parent value that identifies a parent portion of a queue and a first suffix value that identifies a first sub-portion of the queue. The queue manager utilizes the first handle to locate a message within the first queue. The message includes a queue identifier having a parent value portion storing the parent value and a suffix value portion storing the first suffix value.

The queue manager receives a second handle identifying a second queue that is to receive the located message. The second handle includes the same parent value and a second suffix value identifying a second sub-portion of the queue. The queue manager stores the second suffix value in the suffix value portion of the queue identifier so as to logically move the message from the first queue to the second queue.

Messages partitioned and moved in accordance with the principles of the present invention can be stored on computer-readable media. The messages can include a content field storing content values that represent the content of the electronic message. The messages can include a queue identifier field storing a queue identifier value identifying a queue where the content of the electronic message represented in the content field is to be enqueued. The queue identifier field can further include a parent value field storing a parent value identifying a parent portion of the queue and a suffix value field storing a suffix value identifying a sub-portion of the queue.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention provide for using subqueues to enhance local message processing. In some embodiments, received messages are partitioned into subqueues. For example, a queue manager receives a message for delivery to a receiving application from a sending application. The message includes a queue identifier having a parent value portion storing a parent value that identifies a receiving queue.

The queue manager enqueues the message in the receiving queue based on the stored parent value. The receiving application examines the enqueued message. The receiving application assigns a subqueue suffix value that identifies a sub-queue of the receiving queue. The application stores the subqueue suffix value in the suffix value portion of the queue identifier so as to logically move the message from the receiving queue to the identified subqueue of the receiving queue in accordance with the message examination.

In other embodiments, a message is moved between queues. For example, a queue manager receives a first handle that identifies a first queue. The first handle includes a parent value that identifies a parent portion of a queue and a first suffix value that identifies a first sub-portion of the queue. The queue manager utilizes the first handle to locate a message within the first queue. The message includes a queue identifier having a parent value portion storing the parent value and a suffix value portion storing the first suffix value.

The queue manager receives a second handle identifying a second queue that is to receive the located message. The second handle includes the same parent value and a second suffix value identifying a second sub-portion of the queue. The queue manager stores the second suffix value in the suffix value portion of the queue identifier so as to logically move the message from the first queue to the second queue.

Messages partitioned and moved in accordance with the principles of the present invention can be stored on computer-readable media. The messages can include a content field storing content values that represent the content of the electronic message. The messages can include a queue identifier field storing a queue identifier value identifying a queue where the content of the electronic message represented in the content field is to be enqueued. The queue identifier field can further include a parent value field storing a parent value identifying a parent portion of the queue and a suffix value field storing a suffix value identifying a sub-portion of the queue.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
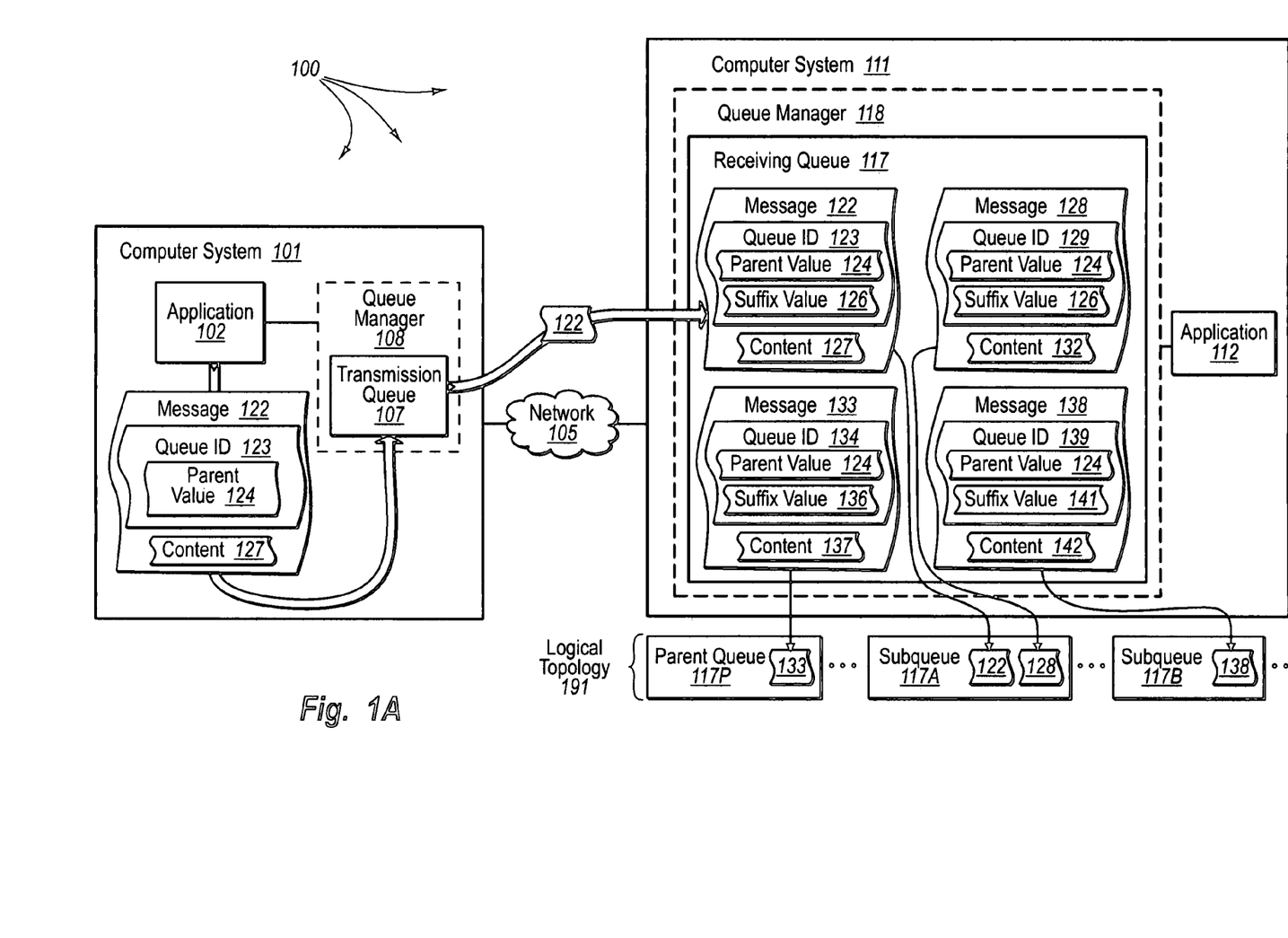
FIGS. 1A, 1B, and 1C illustrate an example of a computer architecture that facilitates using subqueues to enhance local message processing.
Figure 1B:
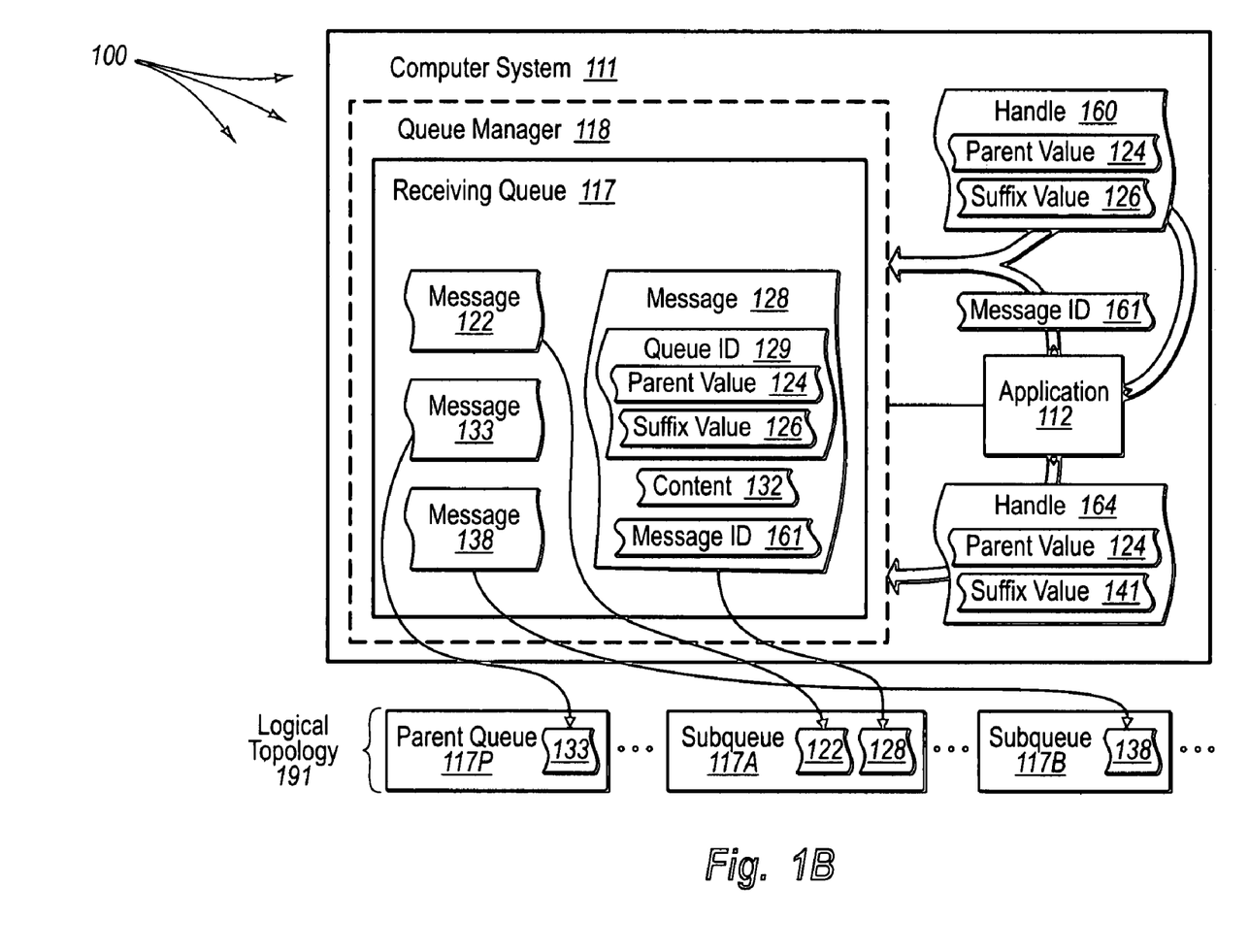
Figure 1C:
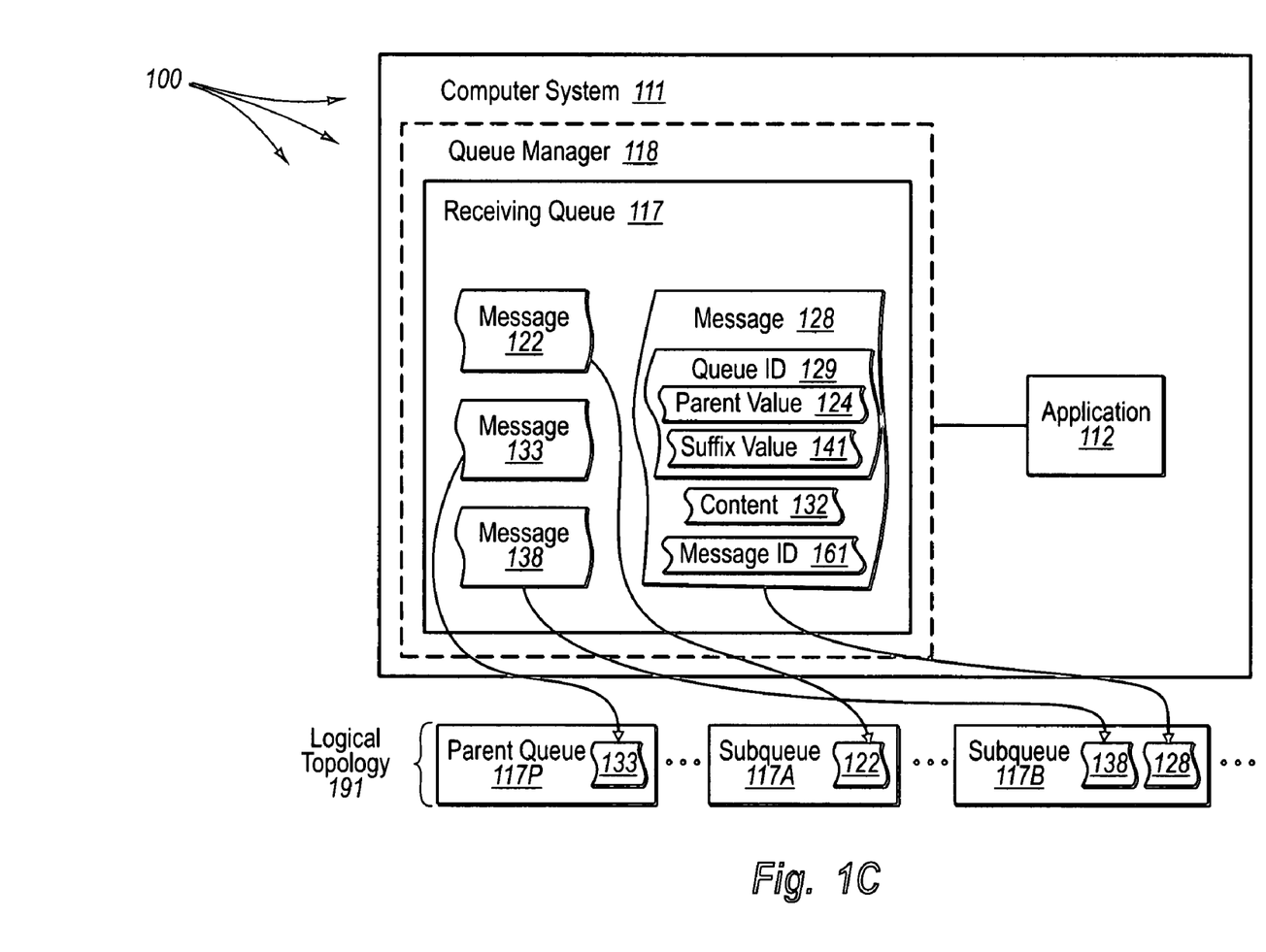

FIGS. 1A, 1B, and 1C illustrate an example of a computer architecture 100 (or portions there of) that facilitate using subqueues to enhance local message processing. Depicted in computer architecture 100 (FIG. 1A) are computer system 101, network 105, and computer system 111. Each of the computer systems 101 and 111 are connected to network 105, such as, for example, a Local Area Network ("LAN"), a Wide Area Network ("WAN"), or even the Internet. Computer systems connected network 105 can receive data from and send data to other computer systems connected network 105. Accordingly, computer systems 101 and 111, as well as other connected computer systems (not shown), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, computer systems 101 and 111 create SOAP envelopes, exchange SOAP envelopes over network 105, and receive SOAP envelopes.

Computer system 101 includes application 102 and queue manager 108. Application 102 can be a portion of a distributed application, such as, for example, a Web service. Queue manager 108 includes and controls the operation of transmission queue 107. For example, queue manager 108 controls the queueing of messages into and dequeing of messages from transmission queue 107.

Computer system 111 includes application 102 and queue manager 118. Application 112 can be a portion of a distributed application, such as, for example, Web service. Queue manager 118 includes and controls the operation of receiving queue 117. For example, queue manager 118 controls the queueing of messages into and dequeing of messages from transmission queue 107.

It may be that application 102 and application 112 are portions of the same distributed application. Thus, from time to time, application 102 sends messages to (and potentially receives messages from) application 112. To send a message to application 112, application 102 and queue manager 108 can, for example, according to a capture protocol, cause message 122 to be enqueued in transmission queue 107. Then at an appropriate time, queue manager 108 can transfer message 122, via network 105, to queue manager 118.

Generally, messages can be data structures that include a header portion having one or more data fields and a body portion having one or more data fields. For example, a message (e.g., message 122) can include a content field storing content values that represent the content of the electronic message (e.g., represented by content 127). A message can also include a queue identifier field storing a queue identifier value identifying a queue where the content of the electronic message represented in the content field (e.g., represented by queue ID 123) is to be enqueued. A queue identifier field can further include a parent value field storing a parent value identifying a parent portion of the queue; (e.g., represented by parent value 124) and a suffix value field storing a suffix value identifying a sub-portion of the queue (e.g., represented by suffix value 136). Other fields can also be included in a data structure for representing a message.

A queue identifier can be formatted in accordance with a variety of different naming schemes. In some embodiments, a queue identifier includes a fixed length parent value and a fixed length suffix value. In other embodiments, a queue identifier includes a variable-length parent value and a fixed length suffix value. These other embodiments provide additional flexibility for the parent value and allow for in-situ changing of the suffix value. In further embodiments, a queue identifier includes a variable length suffix value. In these further embodiments, enough space for the largest possible suffix value is reserved.

Applications can define any number of local subqueues for each queue. For example, application 112 can define subqueues 117A and 117B for queue 117. A subqueue retains all the properties of the queue from which it is derived. For example, subqueues 117A and 117B retain all the properties of queue 117, including quota, security, transactional type, authenticated, privacy level properties.

Subqueues can be created by storing a new (or otherwise not currently used) suffix value in a queue ID. Thus, separate queue creation mechanisms are not needed to create a subqueue. For example, a new subqueue can be created by calling a MessageMove Application Program Interface ("API") that includes a new suffix value. When the new suffix is copied to a queue ID a new subqueue is logically created and as a result the corresponding message is logically stored in the subqueue. When no messages contain a previously used suffix value (e.g., when all messages that previously occupied a subqueue are moved to other subqueues or have been consumed by the receiving application) the subqueue is logically deleted.

Figure 2:
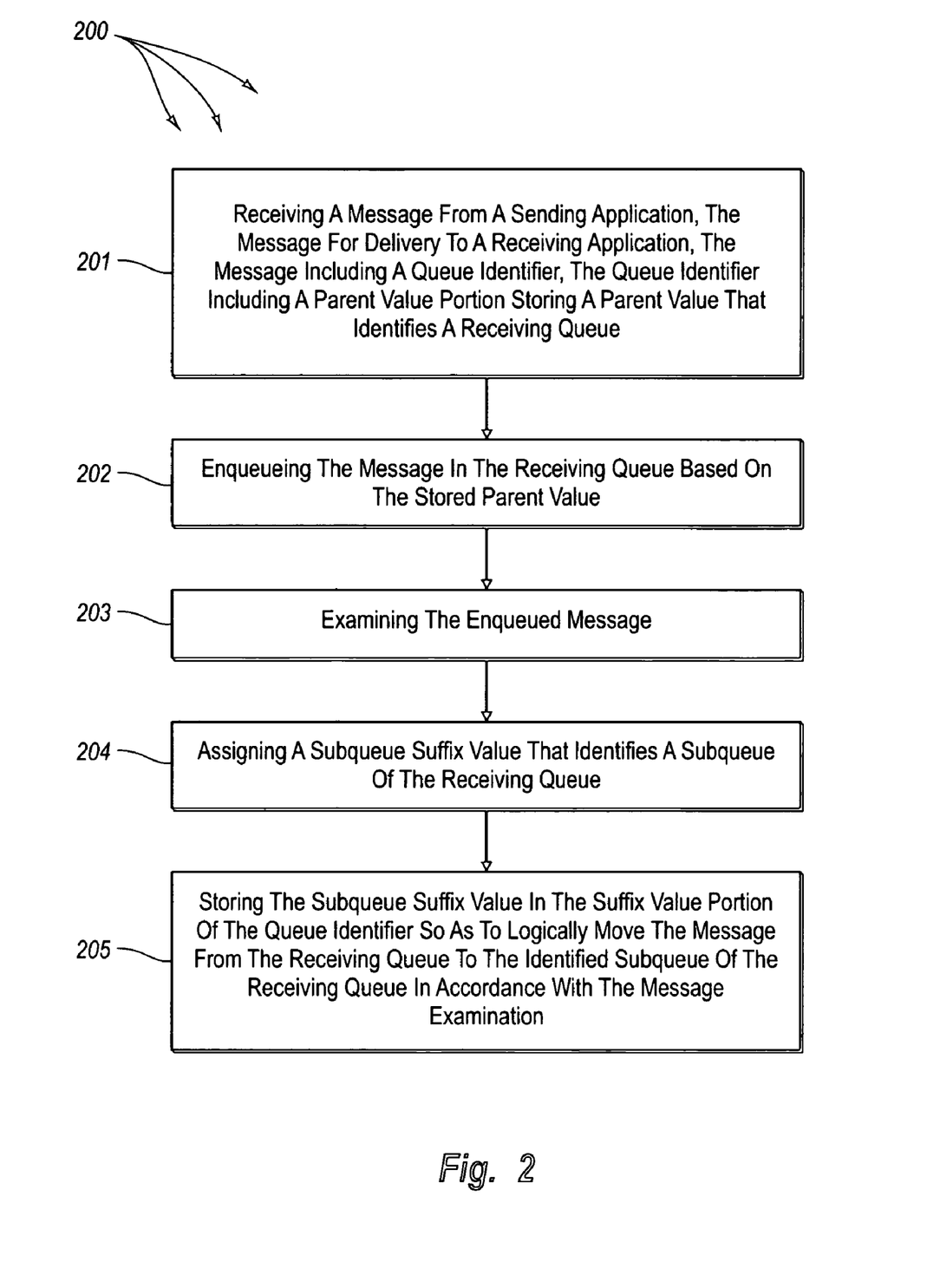
FIG. 2 illustrates an example flow chart of a method for partitioning queued messages within a queue.

FIG. 2 illustrates an example flow chart of a method for partitioning queued messages within a queue. Method 200 will be described with respect to the components and messages in FIG. 1A.

Method 200 includes an act of receiving a message from a sending application, the message for delivery to a receiving application (act 201). For example, queue manager 118 can receive message 122 from queue manager 108. The message can include a queue identifier. For example, message 122 includes queue ID 123. The queue identifier has a parent value portion storing a parent value that identifies a receiving queue. For example, queue ID 123 includes parent value 124 identifying receiving queue 117.

Method 200 includes an act of enqueueing the message in the receiving queue based on the stored parent value (act 202). For example, queue manager 118 can enqueue message 122 in receiving queue 117. Queue manager 118 can identify receiving queue 117 based on parent value 124 (e.g., a URI included in the message by application 102).

Method 200 includes an act of examining the enqueued message (act 203). Examining an enqueued message can include examining the content, such as, for example, message bodies and/or message headers, of the enqueued message. For example, application 112 can examine (or PEEK) at content 127. Based on specified administrator configurable data rules it can be determined that message 122 is to be partitioned or routed to a corresponding sub-queue. For example, if examination of message 122 reveals that message 122 is a poisonous message, message 122 can be moved to a poisonous message sub-queue (and then later moved back into the parent queue). Alternately, data routing can be used to break-up or partition large portions of data across a number of sub-queues that each contain a subset of the larger portion of data. For example, if examination of message 122 reveals a telephone number in the range of 000-0000 to 399-9999 message 122 can be routed to a first sub-queue, a telephone number in the range of 400-0000 to 699-9999 message 122 can be routed to a second sub-queue, and a telephone number in the range of 700-0000 to 999-9999 message 122 can be routed to a third sub-queue.

Method 200 includes an act of assigning a subqueue suffix value that identifies a subqueue of the receiving queue (act 204). For example, application 112 can assign suffix value 126 that, in combination with parent value 124, identifies subqueue 117A. Application 112 can identify a subqueue based on the results of the message examination. For example, based on examination of message 122, application 112 can determine that message 122 is to be routed to subqueue 117A.

Thus, generally a queue ID can be represented using the following notation: "parent value;suffix value", wherein the parent value identifies a queue and the suffix value identifies a sub-portion of the identified queue. A parent value can be a URI used by external modules (e.g., application 122) to identify a queue (e.g., queue 117). A suffix value can be a string of characters (e.g., Unicode characters) used by a local application (e.g., application 112) to identify a sub-portion of a parent queue.

An identified sub-portion of a queue can be a sub-queue. For example, "parent value 124;suffix value 126" can be used locally to identify subqueue 117A. However, an identified sub-portion of queue can also be a parent queue. For example, "parent queue 124;suffix value 136" can be used locally to identify parent queue 117P. In some embodiments, a reserved suffix value (e.g., zero) or a null suffix value (represented as "parent queue 124;") is used to identify the parent queue locally.

Method 200 includes an act of storing the subqueue suffix value in the suffix value portion of the queue identifier (act 205). For example, application 112 can store suffix value 126 in queue ID 123, thereby overwriting suffix value 136. Storing a new suffix value in a message has the effect of logically moving the message from the receiving queue to the identified subqueue of the receiving queue. For example storing suffix value 126 in queue id 123 has the effect of logically moving the message from parent queue 117P to subqueue 117A.

As previously described, queue identifiers can be of a fixed length. Application 112 can be configured to use suffix values such that the combination (or concatenation) of a parent value and corresponding suffix value does not exceed this fixed length. Thus, application 112 can store suffix values in a message in place (i.e., while the message remains physically contained in the queue). Accordingly, application 112 does not have to physically move the message out of the queue to logically move the message to another sub-queue. As a result, storing, updating, overwriting, etc., a suffix value (and thus logically moving messages between subqueues) can be performed without generating an acknowledgement message ("ACK") back to queue manager 108. Additionally, since the Send API is not used to updated the message, the identity of the original sender of the queued messages is retained even when the messages are moved between subqueues.

FIG. 1A further depicts messages 128, 133, and 138 that are physically contained in receiving queue 117 along with message 122. Message 128, includes queue ID 129 having parent value 124 and suffix value 126, and content 132. Message 133, includes queue ID 134 having parent value 124 and suffix value 136, and content 137. Message 138, includes queue ID 139 having parent value 124 and suffix value 141, and content 142. Messages 122, 128, 133, and 138 can also include other fields (e.g., message ID fields). However for clarity, these other fields are not shown in FIG. 1A.

Logical topology 191 represents an example topology of queues from the local perspective of application 112. Logical topology 191 includes parent queue 117P (e.g., identified by "parent value 124;"), subqueue 117A (identified by "parent value 124;suffix value 126") and subqueue 117B (identified by "parent value 124;suffix value 141"). Thus, from the perspective of application 112 message 133 is contained in parent queue 117P, messages 122 and 128 are contained in subqueue 117A, and message 138 is contained in subqueue 117B. However, the messages remain physically stored in receiving queue 117.

FIGS. 1B and 1C depict further views of computer system 111. Application 112 can be configured to create, access, and send queue handles (e.g., queue handles 160 and 164) to queue manager 118 (e.g., through calls to a corresponding ("API")). Queue manager 118 can use queue handles to move messages between queues. For clarity, fields within messages 122, 133, and 138 are not expressly depicted. However, messages 122, 133, and 138 retain the fields depicted in FIG. 1A.

Figure 3:
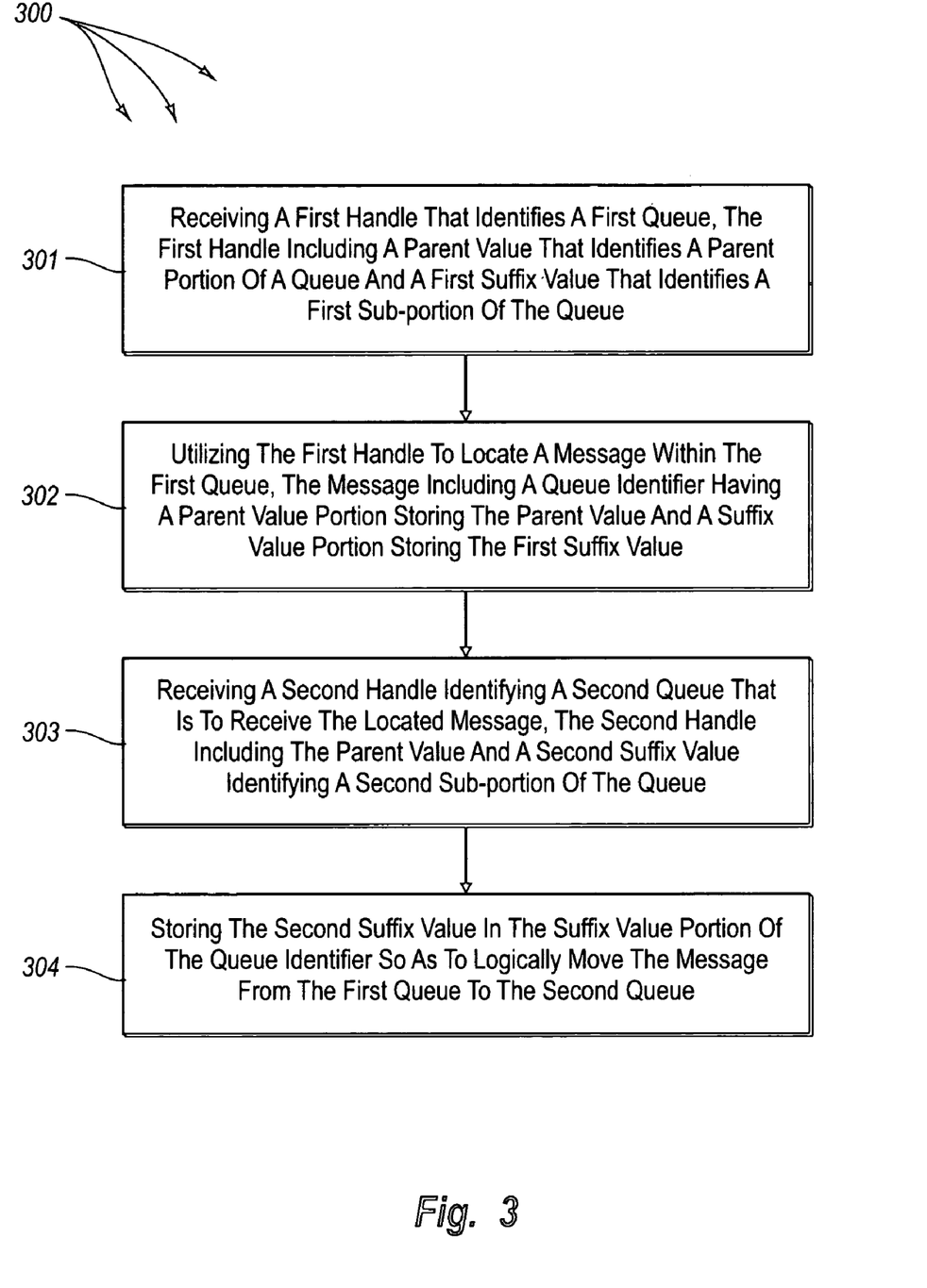
FIG. 3 illustrates an example flow chart of a method for moving a message between queues.

FIG. 3 illustrates an example flow chart of a method for method for moving a message between queues. Method 300 will be described with respect to the components and messages in FIGS. 1B and 1C.

Method 300 includes an act of receiving a first handle that identifies a first queue (act 301). The first handle includes a parent value that identifies a parent portion of a queue and a first suffix value that identifies a first sub-portion of the queue. For example, queue manager 118 can receive handle 160 and message ID 161. Handle 160 includes parent value 124 and suffix value 126 that identify subqueue 117A. As previously described, the queue parent value 124 identifies queue 117 and suffix value 126 identifies subqueue 117A. Message ID 161 can be the message ID of message 128. When message 128 was initially received at queue manager 118, application 112 may have accessed and stored message ID 161.

Method 300 includes an act of utilizing the first handle to locate a message within the first queue (act 302). The message includes a queue identifier having a parent value portion storing the parent value and a suffix value portion storing the first suffix value. For example, queue manager 118 can utilize handle 160 to locate message 128 within subqueue 117A. Message 128 includes queue ID 129 having parent value 124 and suffix value 126.

To locate message 128, queue manager 118 can identify a subset of messages from queue 117 that are logically stored in subqueue 117A. For example, queue manager 118 can search for messages that include suffix value 126. Then, from the subset of identified messages, queue manager 118 can locate message 128 by matching message ID 161 from handle 160 to the message ID 161 contained in message 128.

Method 300 includes an act of receiving a second handle identifying a second queue that is to receive the located message (act 303). The second handle includes the parent value and a second suffix value identifying a second sub-portion of the queue. For example, queue manager 118 can receive handle 164 that identifies subqueue 117B. Handle 164 includes parent value 124 and suffix value 141.

Method 300 includes an act of storing the second suffix value in the suffix value portion of the queue identifier so as to logically move the message from the first queue to the second queue (act 304). For example, queue manager 118 can store suffix value 141 in place in queue ID 129. Storing suffix value 141 causes message 128 to be logically moved from subqueue 117A to subqueue 117B. FIG. 1C depicts message 128 stored in subqueue 117B. Moving messages between subqueues does not alter the order of messages in queue 117.

As previously described, an application can call a queue manager API to move messages between subqueues. Following is one example of a move API:

HRESULT APIENTRY MQMoveMessage( QUEUEHANDLE hQueueFrom, ULONGLONG ulLookupId, QUEUEHANDLE hQueueTo, ITransaction * pTransaction,);

With the example move API the hQueueFrom value represents the Handle to the queue that contains the message (an input value), the ulLookupId value represents LookupId of the message (an input value), for example, which was received earlier in a transaction, the hQueueTo value represents the Handle to the queue that will contain the message after Commit or Receive. Queues can be related as subqueues of the same parent queue, or can be the parent queue itself. The pTransaction value represents a pointer to a transaction object or contstant (an input value). Transaction objects can be obtained internally from Message Queuing, externally from a Distributed Transaction Coordinator, or implicitly from a current context. The example Move API can be called, for example, when an application decides it will not immediately process a message and wants the message to be moved to another local queue for subsequent treatment.

Applications can also utilize other APIs to obtain queue information. For example, an application can call a get into API that returns subqueue information, such as, for example, the number of subqueues in a queue and an array of subqueue names. Such information can be used by the application when creating and moving messages between subqueues.

Thus, embodiments of the present invention facilitate moving messages between queues by altering suffix values of queue IDs. Accordingly, messages can be moved between subqueues in a resource efficient manner without a message actually leaving and reentering a messaging system. As a result, the identity of an original sender can be retained. Further, when messages remain within the messaging system delivery Acknowledgments are not sent back to the original sender when a message is moved between queues. Thus, the original sender is not given potentially inaccurate information indicating a message was delivered to a receiving application when the message was actually transferred between queues.

Figure 4:
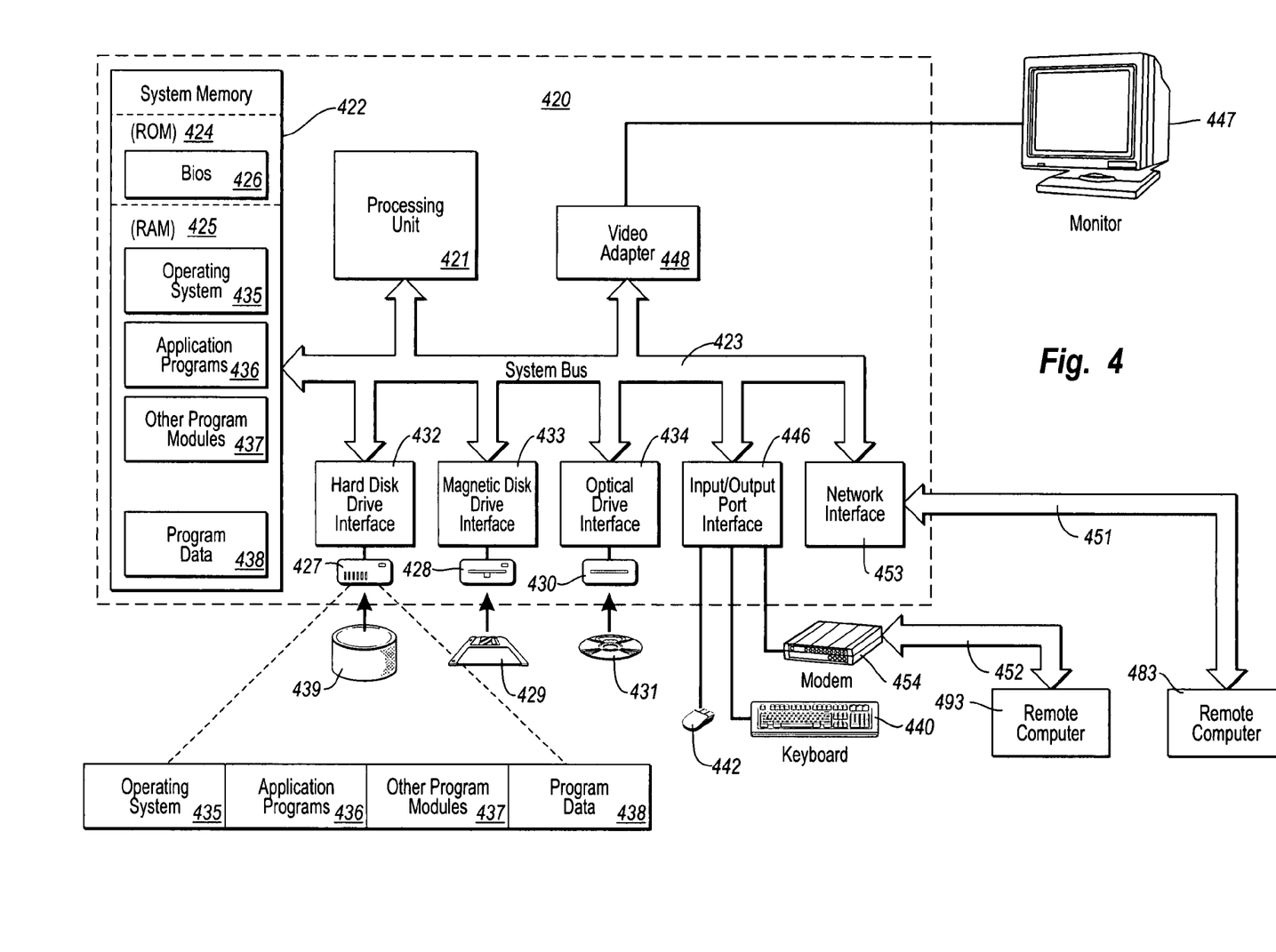
FIG. 4 illustrates a suitable operating environment for the principles of the present invention.

With reference to FIG. 4, an example system for implementing the invention includes a general-purpose computing device in the form of computer system 420, including a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a peripheral bus, and a local bus using any of a variety of bus architectures. The system memory includes read only memory ("ROM") 424 and random access memory ("RAM") 425. A basic input/output system ("BIOS") 426, containing the basic routines that help transfer information between elements within computer system 420, such as during start-up, may be stored in ROM 424.

The computer system 420 may also include magnetic hard disk drive 427 for reading from and writing to magnetic hard disk 439, magnetic disk drive 428 for reading from or writing to removable magnetic disk 429, and optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide non-volatile storage of computer-executable instructions, data structures, program modules, and other data for the computer system 420. Although the example environment described herein employs magnetic hard disk 439, removable magnetic disk 429 and removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 439, magnetic disk 429, optical disk 431, ROM 424 or RAM 425, including an operating system 435, one or more application programs 436, other program modules 437, and program data 438. A user may enter commands and information into computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Input/output interface 446 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 447 or other display device is also connected to system bus 423 via video interface 448. Other peripheral output devices (not shown), such as, for example, speakers and printers, can also be connected to computer system 420.

Computer system 420 is connectable to networks, such as, for example, an office-wide or enterprise-wide computer network, a home network, an intranet, and/or the Internet. Computer system 420 can exchange data with external sources, such as, for example, remote computer systems, remote applications, and/or remote databases over such networks.

Computer system 420 includes network interface 453, through which computer system 420 receives data from external sources and/or transmits data to external sources. As depicted in FIG. 4, network interface 453 facilitates the exchange of data with remote computer system 483 via link 451. Network interface 453 can logically represent one or more software and/or hardware modules, such as, for example, a network interface card and corresponding Network Driver Interface Specification ("NDIS") stack. Link 451 represents a portion of a network (e.g., an Ethernet segment), and remote computer system 483 represents a node of the network.

Likewise, computer system 420 includes input/output interface 446, through which computer system 420 receives data from external sources and/or transmits data to external sources. Input/output interface 446 is coupled to modem 454 (e.g., a standard modem, a cable modem, or digital subscriber line ("DSL") modem) via link 459, through which computer system 420 receives data from and/or transmits data to external sources. As depicted in FIG. 4, input/output interface 446 and modem 454 facilitate the exchange of data with remote computer system 493 via link 452. Link 452 represents a portion of a network and remote computer system 493 represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, modules including applications, queue managers, transmission queues, receiving queues, and, as well as associated data, including application messages, queue identifiers, parent values, suffix values, content, and message IDs can be stored and accessed from any of the computer-readable media associated with computer system 420. For example, portions of such modules and portions of associated program data may be included in operating system 435, application programs 436, program modules 437 and/or program data 438, for storage in system memory 422.

When a mass storage device, such as, for example, magnetic hard disk 439, is coupled to computer system 420, such modules and associated program data may also be stored in the mass storage device. In a networked environment, program modules depicted relative to computer system 420, or portions thereof, can be stored in remote memory storage devices, such as, system memory and/or mass storage devices associated with remote computer system 483 and/or remote computer system 493. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. At a computer system that is network connectable along with one or more other computer systems to a network, the computer system including a queue manager that controls one or more message queues at the computer system, a method for efficiently partitioning queued messages within a queue, the method comprising:

an act of the queue manager receiving a message from a sending application, the message for delivery to a receiving application, the message including a queue identifier having a parent value portion storing a parent value that identifies a receiving queue;

an act of the queue manager enqueueing the message in the receiving queue based on the stored parent value such that the message is stored at a specific location in memory;

an act of the receiving application examining the enqueued message;

based on the examination of the enqueued message, an act of assigning a subqueue suffix value to a suffix value portion of the queue identifier that identifies a subqueue of the receiving queue; and an act of storing the subqueue suffix value in the suffix value portion of the queue identifier such that the enqueued message is logically moved from the receiving queue to the identified subqueue of the receiving queue without moving the message from the specific location in memory, wherein the message is route to the identified subqueue based on the contents of the message;

wherein upon logically moving the enqueued message, a return acknowledgement is not sent to the sending application and the identity of the sending application is preserved.

2. The method as recited in claim 1, wherein an act of the queue manager enqueueing the message in the receiving queue based on the stored parent value comprises an act of enqueueing the message in the receiving queue based on the message including a URI that identifies the receiving queue.

3. The method as recited in claim 1, wherein the act of the receiving application examining the enqueued message comprises an act of applying configurable data rules to the message to determine how the message is to be processed.

4. The method as recited in claim 1, wherein the act of assigning a subqueue suffix value that identifies a subqueue of the receiving queue comprises an act of assigning a string of one or more characters.

5. At a computer system that is network connectable along with one or more other computer systems to a network, the computer system including a queue manager that controls one or more message queues at the computer system, a method for moving a message between queues, the method comprising:

an act of receiving a first handle that identifies a first queue, the first handle including a parent value that identifies a parent queue and a first suffix value that identifies a first subqueue of the parent queue;

an act of utilizing the first handle to locate a message within the first queue, the message including a queue identifier having a parent value portion storing the parent value and a suffix value portion storing the first suffix value, the message being stored at a specific location in memory;

an act of receiving a second handle that identifies a second queue that is to receive the located message, the second handle including the parent value that identifies the parent queue and a second suffix value that identifies a second subqueue of the parent queue; and an act of storing the second suffix value in the suffix value portion of the queue identifier such that the message is logically moved from the first queue to the second queue without moving the message from the specific location in memory; wherein the message is logically moved to the second queue based on the contents of the message and wherein upon logically moving the message, a return acknowledgement is not sent to an application that sent the message and the identity of the sending application is preserved.

6. The method as recited in claim 5, wherein the first suffix value of the first handle is empty such that the first handle identifies the parent queue rather than a subqueue of the parent queue.

7. The method as recited in claim 6, wherein the act of storing the second suffix value in the suffix value portion of the queue identifier such that the message is logically moved from the first queue to the second queue comprises an act of logically moving the message from the parent queue to the second subqueue of the parent queue.

8. The method as recited in claim 5, wherein the first suffix value of the first handle contains a value that identifies the first subqueue of the parent queue such that the first handle identifies the first subqueue of the parent queue.

9. The method as recited in claim 5, wherein the act of utilizing the first handle to locate a message within the first queue comprises an act of identifying messages enqueued in the first queue that have a suffix value equal to the first suffix value.

10. The method as recited in claim 5, wherein the identified first queue is the first subqueue of the parent queue, and wherein the second suffix value of the second handle is empty such that the second handle identifies the parent queue rather than a subqueue of the parent queue.

11. The method as recited in claim 10, wherein the act of storing the second suffix value in the suffix value portion of the queue identifier such that the message is logically moved from the first queue to the second queue comprises an act of logically moving the message from the first subqueue of the parent queue to the parent queue.

12. The method as recited in claim 5, wherein the second suffix value of the second handle contains a value that identifies the second subqueue of the parent queue such that the second handle identifies the second subqueue of the parent queue.

13. The method as recited in claim 5, wherein the act of storing the second suffix value in the suffix value portion of the queue identifier such that the message is logically moved from the first queue to the second queue comprises an act of logically moving the message from the first subqueue of the parent queue to the second subqueue of the parent queue.

* * * * *